US012792226B2

(12) United States Patent
Yun

(10) Patent No.: US 12,792,226 B2
(45) Date of Patent: Nov. 10, 2026

(54) MEMORY CONTROLLER, STORAGE DEVICE INCLUDING THE SAME, AND OPERATING METHOD OF THE MEMORY CONTROLLER

(71) Applicant: SK hynix Inc., Gyeonggi-do (KR)

(72) Inventor: Nam Hyun Yun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/762,667

(22) Filed: Jul. 3, 2024

(65) Prior Publication Data

US 2025/0291495 A1 Sep. 18, 2025

(30) Foreign Application Priority Data

Mar. 18, 2024 (KR) ........................ 10-2024-0037109

(51) Int. Cl.
*G06F 3/06* (2006.01)
*G06F 12/02* (2006.01)

(52) U.S. Cl.
CPC .......... *G06F 3/0619* (2013.01); *G06F 3/0659* (2013.01); *G06F 3/0673* (2013.01); *G06F 12/0253* (2013.01); *G06F 3/0631* (2013.01); *G06F 3/0644* (2013.01); *G06F 3/0658* (2013.01); *G06F 3/0679* (2013.01); *G06F 3/0688* (2013.01); *G06F 12/0292* (2013.01)

(58) Field of Classification Search
CPC .... G06F 3/0619; G06F 3/0659; G06F 3/0673; G06F 12/0253; G06F 3/0631; G06F 3/0644; G06F 3/0658; G06F 3/0679; G06F 3/0688; G06F 12/0292
See application file for complete search history.

(56) References Cited

U.S. PATENT DOCUMENTS 9,032,141 B2 5/2015 Bains et al.
2015/0206558 A1* 7/2015 Ni .......................... G11C 11/408 711/106
2018/0260137 A1* 9/2018 Tsou ...................... G06F 3/0659
2021/0358540 A1* 11/2021 Brandl .............. G11C 11/40615

FOREIGN PATENT DOCUMENTS

KR 10-2593552 B1 10/2023

OTHER PUBLICATIONS

An article/thesis titled Architectural Techniques for Improving NAND Flash Memory Reliability by Yixin Luo. (Year: 2018).*
A Cambridge definition of 'between' taken from dictionary.cabridge.org:80/us/dictionary/english/between downloaded by archive.org on Oct. 1, 2017. (Year: 2017).*

* cited by examiner

*Primary Examiner* — Janice M. Girouard
(74) *Attorney, Agent, or Firm* — IP&T GROUP LLP

(57) ABSTRACT

A memory controller may store data in the nonvolatile memory device or read data from the nonvolatile memory device based on an external request; and schedule, based on appearance frequency of a logical address included in the external request, processing performance of a processing operation for the external request and an internal management operation for the nonvolatile memory device.

10 Claims, 6 Drawing Sheets

210

2200

MEMORY CONTROLLER, STORAGE DEVICE INCLUDING THE SAME, AND OPERATING METHOD OF THE MEMORY CONTROLLER

CROSS-REFERENCES TO RELATED APPLICATION

The present application claims priority under 35 U.S.C. § 119(a) to Korean Patent Application No. 10-2024-0037109, filed on Mar. 18, 2024, which is incorporated herein by reference in its entirety.

BACKGROUND

1. Technical Field

Various embodiments of the present disclosure relate to a semiconductor integrated device, and more particularly, to a memory controller, a storage device including the same, and an operating method of the memory controller.

2. Related Art

A storage device is electrically coupled to an external device, and performs data input and output operations based on a request from the external device. The storage device may use various storage media in order to store data, and may adopt a nonvolatile memory device, such as a flash memory, as a storage medium.

The flash memory is incapable of overwriting or in-place update, and a read/write unit and an erase unit in the flash memory are different from each other. Accordingly, the flash memory has to map a logical address that is provided by the external device to a physical address in order to process a read/write request from the external device.

Mapping information between the logical address and the physical address is stored in the nonvolatile memory device, and may be loaded onto a buffer memory device and used.

The buffer memory device may include a volatile memory device, and needs to be refreshed in order to prevent a data loss.

SUMMARY

In an embodiment of the present disclosure, a memory controller may store data in the nonvolatile memory device or read data from the nonvolatile memory device based on an external request; and schedule, based on appearance frequency of a logical address included in the external request, processing performance of a processing operation for the external request and an internal management operation for the nonvolatile memory device.

In an embodiment of the present disclosure, a storage device may include a nonvolatile memory device; a volatile memory device configured to store map data including mapping information between a logical address and physical address corresponding to data stored in the nonvolatile memory device; and a memory controller configured to schedule processing performance of a processing operation for an external request and an internal management operation for the nonvolatile memory device, based on information on a location of the volatile memory device, at which the map data associated with the external request have been stored.

In an embodiment of the present disclosure, an operating method of a memory controller that controls a storage medium may include determining, by the memory controller, appearance frequency of a logical address that is included in an external request when receiving the external request; and scheduling, by the memory controller, processing performance of a processing operation for the external request and an internal management operation for the storage medium, based on a result of the determination.

Embodiments of the present disclosure may provide a memory controller, a storage device including the same, and an operating method of the memory controller, which can prevent access to buffer memory device from being concentrated.

According to embodiments of the present disclosure, an attack against a buffer memory device can be blocked by processing an internal management operation in preference to an external request when the external request in which access to a specific region of the buffer memory device is concentrated is detected.

DETAILED DESCRIPTION

Hereinafter, embodiments of the present disclosure will be described in detail with reference to the accompanying drawings.

Figure 1:
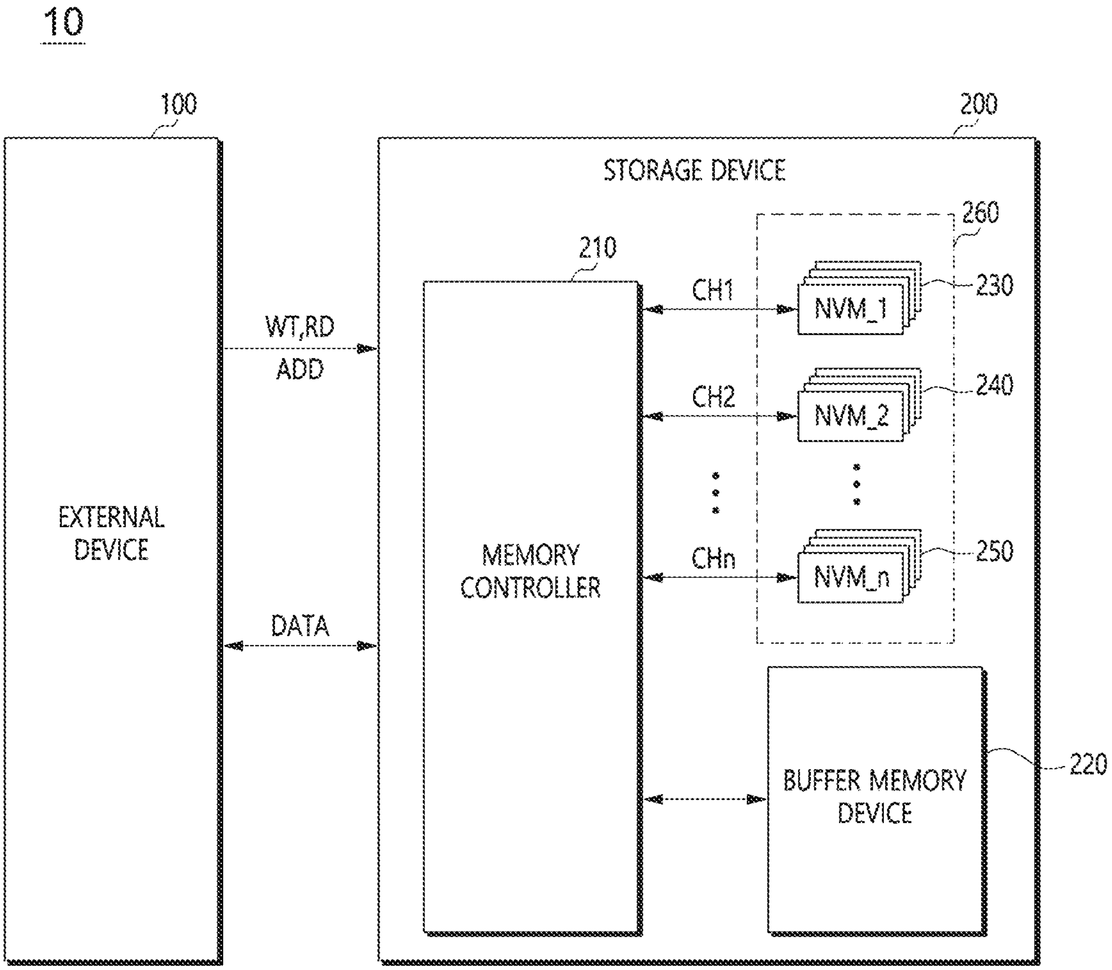
FIG. 1 is a diagram illustrating a configuration of a data processing system according to an embodiment of the present disclosure.

FIG. 1 is a diagram illustrating a configuration of a data processing system 10 according to an embodiment of the present disclosure.

Referring to FIG. 1, the data processing system 10 may include an external device (i.e., a host device) 100 and a storage device 200.

The external device 100 may include at least one processor, and may be a processor itself or may be an electronic device or system including a processor.

The storage device 200 may include a memory controller 210, a buffer memory device 220, and a storage medium

260. The storage medium 260 may include at least a plurality of nonvolatile memory devices 230, 240, and 250.

The external device 100 may transmit a write request, including a write command WT, an address ADD, and write data DATA, to the storage device 200 in order to write data. In response thereto, the storage device 200 may operate so that the write data are programmed into the storage medium 260.

The external device 100 may transmit a read request, including a read command RD and an address ADD, to the storage device 200 in order to read data. The storage device 200 may read, from the storage medium 260, data DATA for which the read request has been made, and may transmit the data DATA to the external device 100.

The storage device 200 may read data from the storage medium 260 or write data into the storage medium 260, in order to perform an internal management operation of managing the storage medium 260 in addition to read and write requests from the external device 100. The internal management operation may include a house-keeping operation that is performed regardless of a request from the external device 100, such as a garbage collection operation, a wear-leveling operation, or a read reclaim operation, in order to efficiently use a storage space of the storage medium 260 or guarantee the reliability of data that have been stored in the storage medium 260.

The storage medium 260 may be electrically coupled to the memory controller 210 through one or more channels CH1 to CHn, and may include one or more nonvolatile memory devices NVM1 and NVM2 to NVMn. In an embodiment, the nonvolatile memory devices NVM1 and NVM2 to NVMn may include at least one of nonvolatile memory devices having various forms, such as a NAND flash memory, a NOR flash memory, a ferroelectric RAM (FRAM) using a ferroelectric capacitor, a magnetic RAM (MRAM) using a tunneling magneto-resistive (TMR) film, a phase change memory (PRAM) using chalcogenide alloys, and a resistive memory (RERAM) using transition metal oxide.

Each of the nonvolatile memory devices NVM1 and NVM2 to NVMn may include a plurality of memory cells. Each of the memory cells may operate as a single level cell (SLC) capable of storing 1-bit data or a multi-level cell (MLC) capable of storing 2-bit or more data.

Each of the nonvolatile memory devices NVM1 and NVM2 to NVMn may operate as an SLC memory device or may operate as an MLC memory device. Alternatively, some of the nonvolatile memory devices NVM1 and NVM2 to NVMn may each be configured to operate as an SLC memory device, and some of the nonvolatile memory devices NVM1 and NVM2 to NVMn may each be configured to operate as an MLC memory device.

After the start of a write or read operation, the buffer memory device 220 may temporarily store data that are transmitted and received between the external device 100 and the storage device 200. The buffer memory device 220 may temporarily store map data. The map data may be mapping information between an address (e.g., a physical address) of a physical storage space that constitutes the storage medium 260 and a logical address that has been assigned to the storage medium 260 by the external device.

The map data may be stored in the storage medium 260. The memory controller 210 may use map data that are necessary for an operation of the storage device 200 by at least partially loading the map data onto the buffer memory device 220.

Figure 2:
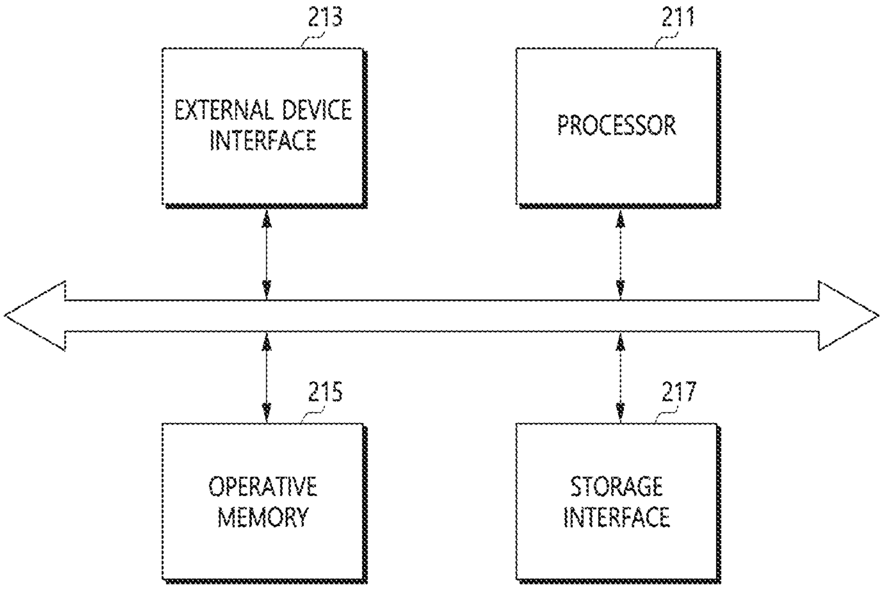
FIG. 2 is a diagram illustrating a configuration of a memory controller according to an embodiment of the present disclosure.

FIG. 2 is a diagram illustrating a configuration of the memory controller 210 according to an embodiment of the present disclosure.

Referring to FIG. 2, the memory controller 210 may include a processor 211, an external device interface 213, operative memory (or working memory) 215, and a storage interface 217.

The processor 211 may operate by executing, on hardware of the memory controller 210, firmware or software that is provided for various operations of the memory controller 210. The processor 211 may be implemented in a form in which hardware and firmware or software that operates on the hardware have been combined. In an embodiment, the processor 211 may perform a function of a flash transport layer (FTL) that manages the storage device 200, for example, address mapping, block management, garbage collection, or wear-leveling.

The external device interface 213 may receive a command and a clock signal from the external device 100 under the control of the processor 211, and may provide a communication channel that controls the input and output of data. In particular, the external device interface 213 may provide a physical connection between the external device 100 and the storage device 200.

In an embodiment, the external device interface 213 may communicate with the external device 100, based on an interface that uses at least one of various communication standards or interfaces, such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA (SATA) protocol, a parallel-ATA (PATA) protocol, a small computer small interface (SCSI) protocol, an enhanced small disk interface (ESDI) protocol, an integrated drive electronics (IDE) protocol, a private protocol, a system management bus (SMBus) protocol, an inter-integrated circuit (I2C) protocol, and an improved inter-integrated circuit (I3C) protocol.

The external device interface 213 may store write data that are provided by the external device 100 in the buffer memory device 220, under the control of the processor 211. Furthermore, the external device interface 213 may provide the external device 100 with read data that have been read from the storage medium 260 and stored in the buffer memory device 220.

The operative memory 215 may include a random access memory device (RAM), such as a dynamic random access memory (DRAM) or a static random access memory (SRAM). The operative memory 215 may store firmware that is driven by the processor 211. Furthermore, the operative memory 215 may store data that are necessary for the driving of firmware, for example, meta data.

The operative memory 215 may operate as buffer memory that stores write data that are provided by the external device 100, read data that are read from the storage medium 260, or map data.

The storage interface 217 may provide a communication channel for the transmission and reception of signals between the memory controller 210 and the storage medium 260. The storage interface 217 may write data that have been temporarily stored in the buffer memory device 220, in the storage medium 260, under the control of the processor 211. Furthermore, the storage interface 217 may temporarily store read data that are read from the storage medium 260 by transmitting the read data to the buffer memory device 220, under the control of the processor 211.

Figure 3:
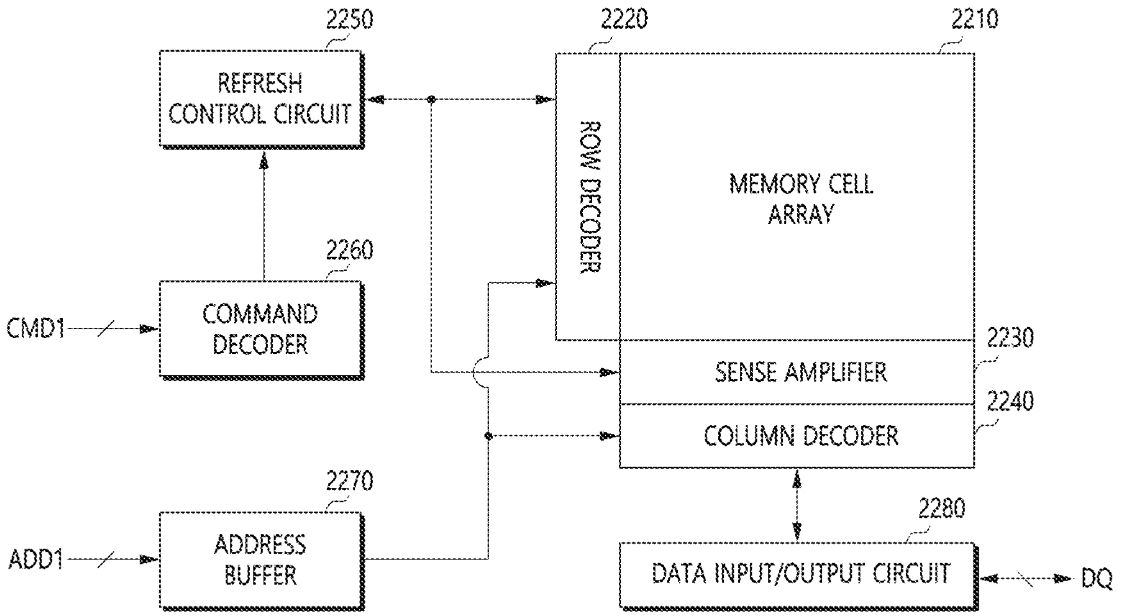
FIG. 3 is a diagram illustrating a configuration of a buffer memory device according to an embodiment of the present disclosure.

FIG. 3 is a diagram illustrating a configuration of a buffer memory device 2200 according to an embodiment of the present disclosure.

The buffer memory device 2200 in FIG. 3 may be adopted as the buffer memory device 220 illustrated in FIG. 1 or the operative memory 215 illustrated in FIG. 2.

Referring to FIG. 3, the buffer memory device 2200 may include a memory cell array 2210, a row decoder 2220, a sense amplifier 2230, a column decoder 2240, a refresh control circuit 2250, a command decoder 2260, an address buffer 2270, and a data input/output circuit 2280.

The memory cell array 2210 may include a plurality of memory cells that have been arranged in a row direction and a column direction. The plurality of memory cells may include main cells that are used to store data and redundancy cells that replace a memory cell having an error.

Figure 4:
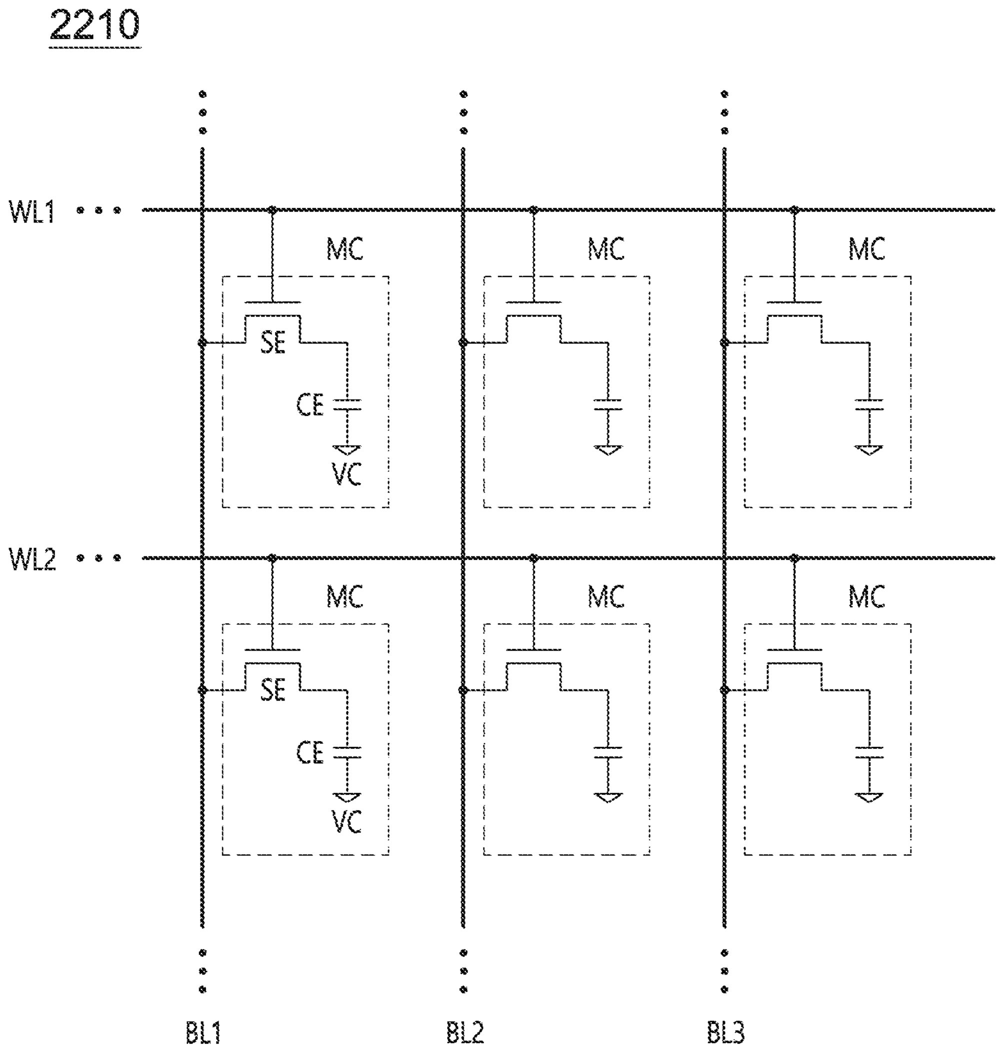
FIG. 4 is a diagram illustrating a configuration of a memory cell array that is included in the buffer memory device according to an embodiment of the present disclosure.

FIG. 4 is a diagram illustrating a configuration of the memory cell array 2210 that is included in the buffer memory device 2200 according to an embodiment of the present disclosure.

FIG. 4 illustrates the memory cell array 2210 including DRAM cells.

Referring to FIG. 4, the memory cell array 2210 may include memory cells MC that are arranged between a plurality of word lines WL1, WL2, . . . and a plurality of bit lines BL1, BL2, BL3, . . . .

Each of the memory cells MC may include a selection element SE and a capacity element CE. The selection element SE may operate based on a voltage of a corresponding word line, among the word lines WL1, WL2, . . . . When a corresponding word line, among the word lines WL1, WL2, . . . , is activated, the selection element SE may be turned on, and may electrically couple the capacity element CE to a corresponding bit line, among the bit lines BL1, BL2, BL3, . . . . When a corresponding word line, among the word lines WL1, WL2, . . . , is deactivated, the selection element SE may be turned off, and may electrically separate the capacity element CE from a corresponding bit line, among the bit lines BL1, BL2, BL3, . . . .

The capacity element CE may be electrically coupled between the selection element SE and a common node to which a common voltage VC is applied. The capacity element CE may include a capacitor. The capacity element CE may store data bit by storing charges according to a voltage that is transmitted by a corresponding word line, among the bit lines BL1, BL2, BL3, . . . , through the selection element SE.

Referring back to FIG. 3, the command decoder 2260 may internally generate a decoded control signal (e.g., an active signal, a read signal, a write signal, or a refresh signal) by receiving and decoding a command CMD1 that is applied by control logic (not illustrated). The refresh control circuit 2250 may receive a refresh signal from the command decoder 2260 and output a row address that refreshes a word line of the memory cell array 2210 to the row decoder 2220.

The control logic may transmit an address ADD1 that designates a memory cell that writes/reads data to the buffer memory device 2200, along with the command CMD1. The address buffer 2270 may generate a row/column address by receiving the address ADD1 from the control logic.

The row decoder 2220 may decode a row address that is output by the refresh control circuit 2250 or the address buffer 2270, in order to designate one word line of the memory cell array 2210. That is, after the start of a write/read operation, the row decoder 2220 may enable a word line that has been electrically coupled to a memory cell in/from which data will be written/read by decoding a row address that is output by the address buffer 2270. Furthermore, the row decoder 2220 may refresh a corresponding word line based on a row address that is generated by the refresh control circuit 2250.

The sense amplifier 2230 may sense and amplify the data of a memory cell that has been electrically coupled to a word line that has been designated by the row decoder 2220, and may store the data of the memory cell. Furthermore, the column decoder 2240 may decode a column address that is output by the address buffer 2270, in order to designate a bit line that has been electrically coupled to a memory cell to or from which data will be input or output.

The data input/output circuit 2280 may output data from a memory cell that has been designated by the address ADD1 or input data to a corresponding memory cell in the memory cell array 2210. Data that are input through the data input/output circuit 2280 may be written in the memory cell array 2210 based on the address ADD1, or data that are read from the memory cell array 2210 may be output to the control logic through the data input/output circuit 2280 based on the address ADD1.

When a specific word line is activated and data are written or read, a voltage change may occur in a capacity element of memory cells that have been electrically coupled to the activated word line.

A voltage change that occurs in the capacity element of the memory cells that have been electrically coupled to the activated word line may cause a voltage change attributable to coupling in capacity elements that are included in memory cells of consecutive word lines. The voltage change attributable to the coupling may act as stress in the memory cells, and may cause an error of a data bit.

When a specific word line is concentrically activated, row hammering in which data are distorted because stress applied to memory cells of a consecutive word line is increased may occur.

In order to prevent a data loss attributable to the row hammering, there may be used a known scheme that performs refresh on a consecutive word line of a corresponding word line at frequent intervals when the corresponding word line is concentrically accessed. The frequent refresh may cause to degrade performance of a memory system. The reason for this is that excessive power is consumed because a voltage needs to be applied to a word line to be refreshed and a memory cell to be refreshed cannot be accessed while refresh is performed.

In the data processing system 10 or the storage device 200 that stores map data in the buffer memory device 2200, row hammering may occur when a specific logical address or a specific logical address range is frequently accessed.

Figure 5:
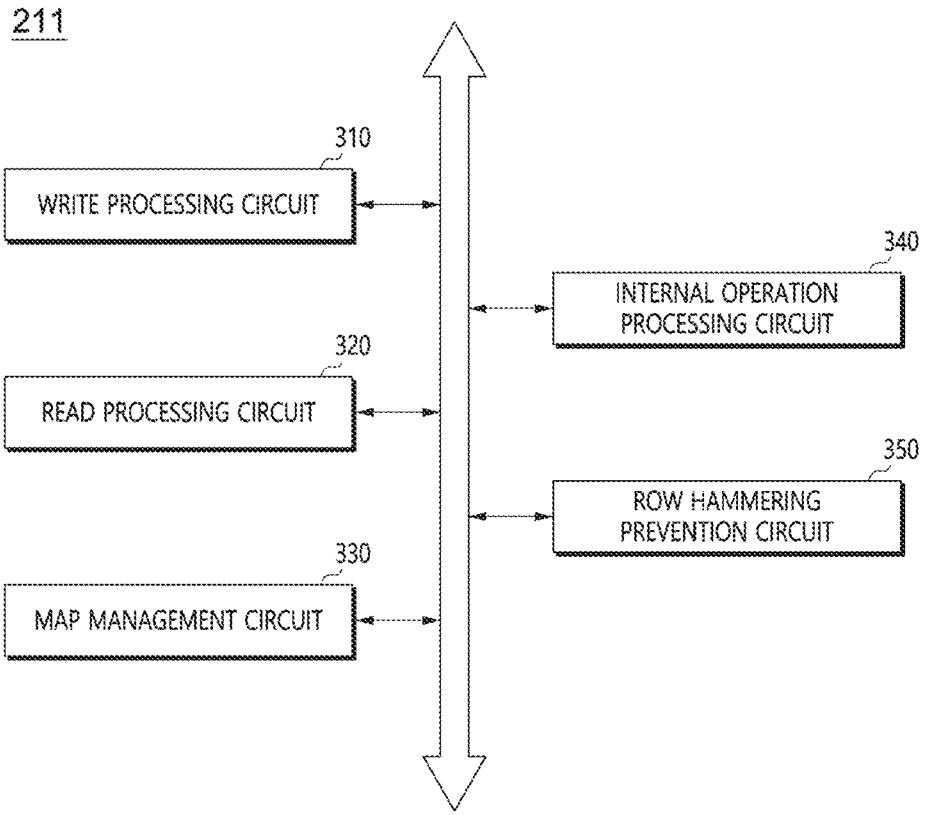
FIG. 5 is a diagram illustrating a configuration of a processor according to an embodiment of the present disclosure.

FIG. 5 is a diagram illustrating a configuration of the processor 211 according to an embodiment of the present disclosure.

Referring to FIG. 5, the processor 211 may include a write processing circuit 310, a read processing circuit 320, a map management circuit 330, an internal operation processing circuit 340, and a row hammering prevention circuit 350.

The write processing circuit 310 may control the storage medium 260 to program write data. The write data may be data that are provided by the external device 100 along with a write request from the external device 100 or that have been associated with an internal management operation for the storage device 200.

The read processing circuit 320 may control the storage medium 260 to read data in a specific physical region from the storage medium 260. A read operation may be performed in accordance with a read request from the external device 100 and a logical address, or may be performed in association with an internal management operation for the storage device 200. Data that are read from the storage medium 200 based on a read request from the external device 100 may be provided to the external device 100.

The map management circuit 330 may control the non-volatile memory device 260 and the buffer memory device 220 to perform operations that are related to map data. The operations that are related to the map data may include a map caching operation and a map update operation.

When a write request, a logical address to be written, and write data are provided by the external device 100, the processor 211 may perform an map update operation of storing map data in which a physical address at which the write data will be stored has been mapped to the logical address to be written, in the buffer memory device 220, and updating an address mapping table that has been stored in the storage medium 260 based on the map data stored in the buffer memory device 220, by driving the map management circuit 330.

Furthermore, the processor 211 may perform a map caching operation of caching, in the buffer memory device 220, map data corresponding to a logical address for which a read request has been frequently or recently made by the external device 100, by driving the map management circuit 330.

The internal operation processing circuit 340 may perform an internal management operation on the storage medium 260 regardless of a request from the external device 100. If an operation according to a request from the external device 100 is a foreground operation, an internal management operation that is autonomously processed by the processor 211 may be denoted as a background operation. In an embodiment, the internal management operation may be at least one of a wear-leveling operation, a garbage collection operation, and a read reclaim operation.

The row hammering prevention circuit 350 may schedule processing performance of a processing operation for an external request and an internal management operation for the storage medium 260, based on the appearance frequency of a logical address that is included in the external request from the external device 100.

From a different viewpoint, the row hammering prevention circuit 350 may schedule processing performance of a processing operation for an external request and an internal management operation, based on frequency of access to the buffer memory device 220, for reading map data corresponding to a logical address that is included in the external request.

In order to schedule the processing performance, the row hammering prevention circuit 350 may use various scheduling methods, such as adjusting at least one of a credit allocation ratio, a computer resource allocation ratio, a processing opportunity assignment ratio, and priority.

In an embodiment, when a read request for a specific logical address or a specific logical address range is repeatedly received at a set threshold value or more during a set time, the row hammering prevention circuit 350 may determine that row hammering has occurred and schedule processing performance of an internal management operation so that the processing performance of the internal management operation is higher than processing performance of a processing operation for an external request.

In an embodiment, when determining that row hammering will occur, the row hammer prevention circuit 350 may use various scheduling methods, such as allocating more credits, allocating more resources, providing a greater processing opportunity, or assigning higher priority to an internal management operation than to a processing operation for an external request.

Figure 6:
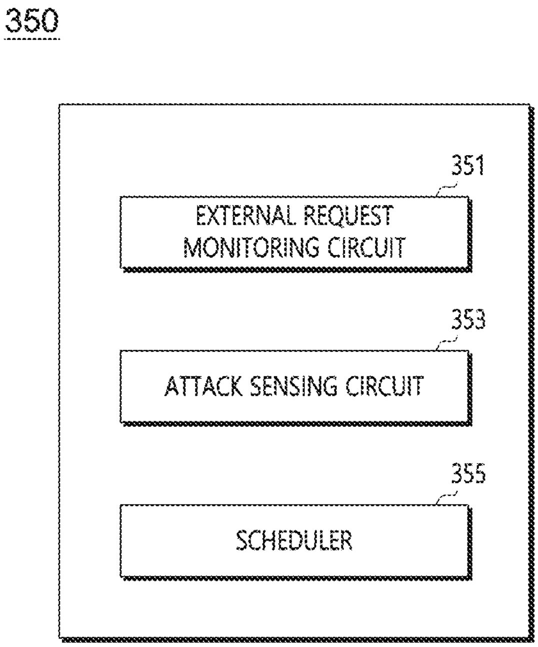
FIG. 6 is a diagram illustrating a configuration of a row hammer prevention circuit according to an embodiment of the present disclosure.

FIG. 6 is a diagram illustrating a configuration of the row hammer prevention circuit 350 according to an embodiment of the present disclosure.

Referring to FIG. 6, the row hammer prevention circuit 350 may include an external request monitoring circuit 351, an attack sensing circuit 353, and a scheduler 355.

The external request monitoring circuit 351 may count the number of appearances of a logical address by receiving a logical address that has been included in a read request from the external device 100. In an embodiment, the read request may include a specific logical address or a specific logical address range. The external request monitoring circuit 351 may count the number of appearances for each logical address or for each logical address range.

The attack sensing circuit 353 may determine a row hammering possibility based on the number of appearances of a specific logical address range or a specific logical address that has been counted during a set time, that is, frequency.

In order to read data that have been stored in the storage medium 260, the map management circuit 330 may obtain a physical address corresponding to a logical address included in a read request by accessing map data of the buffer memory device 220. When a read request for a specific logical address range or a specific logical address is repeated during a set time, the attack sensing circuit 353 may predict an attack in which row hammering will occur in a memory region of the buffer memory device 220 in which map data associated with the read request have been cached.

When the row hammering possibility is predicted, the scheduler 355 may schedule processing performance of a processing operation for an external request from the external device 100 and an internal management operation.

In order to schedule the processing performance, the scheduler 355 may use various scheduling methods, such as adjusting at least one of a credit allocation ratio, a computer resource allocation ratio, a processing opportunity assignment ratio, and priority.

In an embodiment, when the occurrence of row hammering is predicted, the scheduler 355 may allocate more credits, may allocate more resources, may provide a greater processing opportunity, or may assign higher priority to an internal management operation than to a processing operation for an external request.

Figure 7:
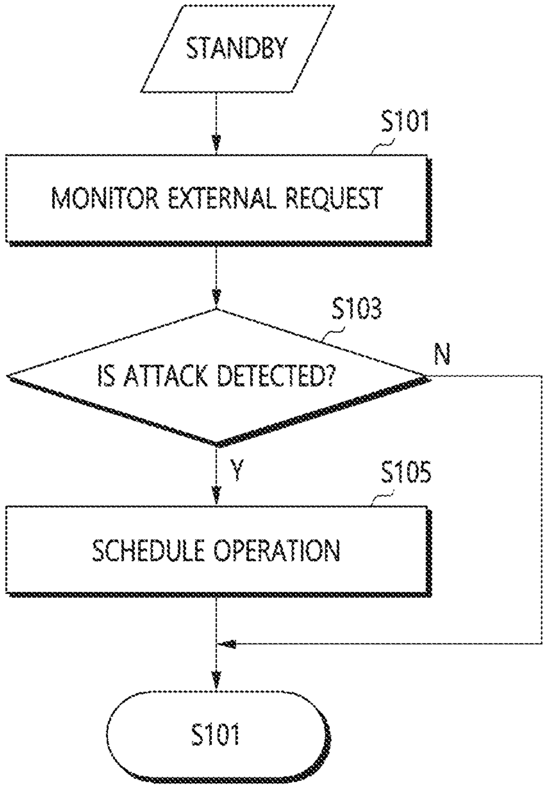
FIG. 7 is a flowchart for describing an operating method of a memory controller according to an embodiment of the present disclosure.

FIG. 7 is a flowchart for describing an operating method of a memory controller according to an embodiment of the present disclosure.

While the storage device 200 operates, the memory controller 210 may count the number of appearances for each specific logical address or logical address range by monitoring a logical address that has been included in a read request from the external device 100 (S101).

The memory controller 210 may determine a row hammering possibility based on the number of appearances of a specific logical address range or a specific logical address that has been counted during a set time (S103). That is, when a read request for the specific logical address is repeated at a set threshold value or more during the set time, the memory controller 210 may predict an attack in which row hammering will occur in a row line of the buffer memory device 220 in which map data associated with the read request have been stored.

When predicting the row hammering possibility (Y in S103), the memory controller 210 may schedule processing performance of a processing operation for the external request from the external device 100 and an internal management operation (S105).

In an embodiment, the memory controller 210 may use various scheduling methods, such as allocating more credits, allocating more resources, providing a greater processing opportunity, or assigning higher priority to the internal management operation than to the processing operation for the external request.

When not predicting a row hammering possibility (N in S103), the memory controller 210 may continuously monitor an external request (S101).

Figure 8:
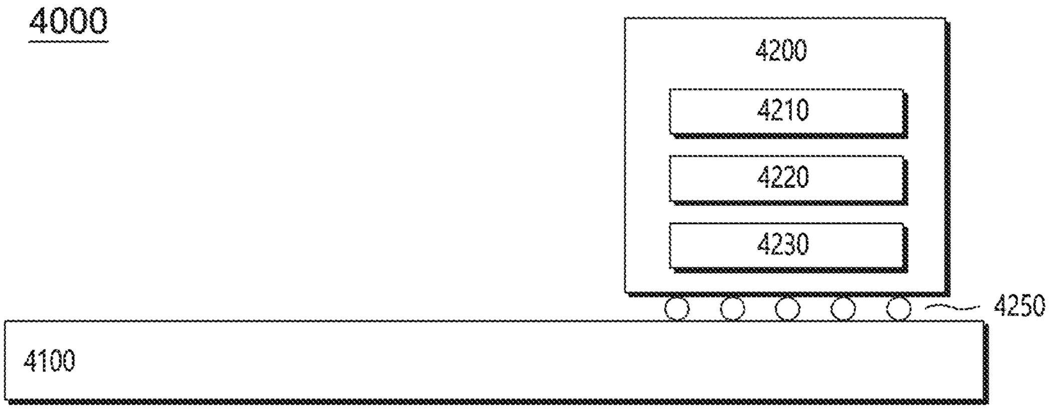
FIG. 8 is a diagram illustrating a configuration of a data processing system according to an embodiment of the present disclosure.

FIG. 8 is a diagram illustrating a configuration of a data processing system 4000 according to an embodiment of the present disclosure.

Referring to FIG. 8, the data processing system 4000 may include a host device 4100 and a memory system 4200.

The host device 4100 may be constructed in the form of a board, such as a printed circuit board. Although not illustrated, the host device 4100 may include background function blocks that perform a function of the host device.

The memory system 4200 may be constructed in the form of a surface mounting package. The memory system 4200 may be mounted on the host device 4100 through solder balls 4250. The memory system 4200 may include a controller 4210, a buffer memory device 4220, and a nonvolatile memory device 4230.

The controller 4210 may control an overall operation of the memory system 4200. The controller 4210 may include the row hammering prevention circuit 350 illustrated in FIGS. 5 and 6.

The buffer memory device 4220 may temporarily store data to be stored in the nonvolatile memory device 4230 or data read from the nonvolatile memory devices 4230. Furthermore, the buffer memory device 4220 may store map data, that is, an address map between a logical address of an external device and a physical address of the nonvolatile memory device 4230.

The nonvolatile memory device 4230 may be used as a storage medium of the memory system 4200.

As the controller 4210 includes the row hammering prevention circuit 350, stress that is applied to the buffer memory device 4220 can be reduced by detecting a malicious and repeated read operation for a specific logical address.

Figure 9:
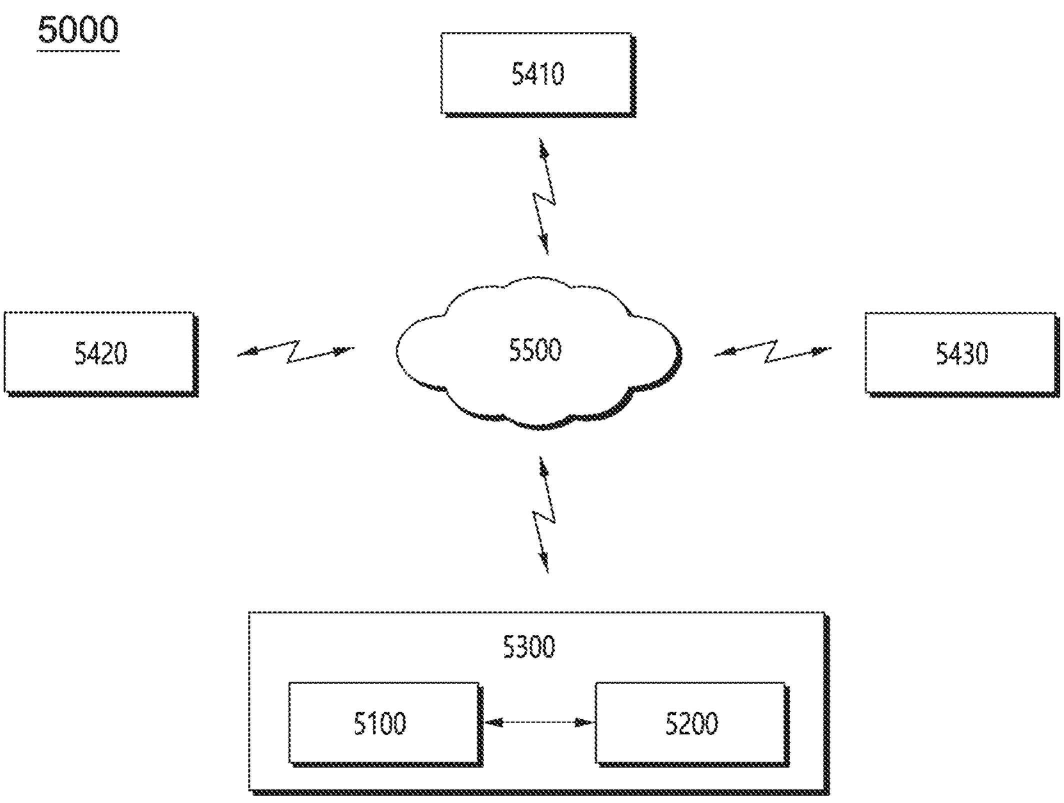
FIG. 9 is a diagram illustrating a configuration of a network system according to an embodiment of the present disclosure.

FIG. 9 is a diagram illustrating a configuration of a network system 5000 according to an embodiment of the present disclosure.

Referring to FIG. 9, the network system 5000 may include a plurality of client systems 5410 to 5430 that are electrically coupled to a server system 5300 over a network 5500.

The server system 5300 may serve data based on a request from the plurality of client systems 5410 to 5430. For example, the server system 5300 may store data that are provided by the plurality of client systems 5410 to 5430. As another example, the server system 5300 may provide data to the plurality of client systems 5410 to 5430.

The server system 5300 may include a host device 5100 and a memory system 5200. The memory system 5200 may include the storage device 200 of FIG. 1 or the memory system 4200 of FIG. 8, which includes the row hammering prevention circuit 350.

As described above, those skilled in the art to which the present disclosure pertains may understand that the embodiments of the present disclosure may be implemented in various other forms without departing from the technical spirit or essential characteristics of the present disclosure. Accordingly, it is to be understood that the aforementioned embodiments are illustrative from all aspects and are not limitative. The scope of the present disclosure is defined by the appended claims rather than by the detailed description, and all modifications or variations derived from the meanings and scope of the claims and equivalents thereof should be understood as being included in the scope of the present disclosure. Furthermore, the embodiments may be combined to form additional embodiments.

What is claimed is:

1. A memory controller that controls a nonvolatile memory device, the memory controller configured to:

store data in the nonvolatile memory device or read data from the nonvolatile memory device based on an external request;

determine an appearance frequency of a logical address that is included in the external request when receiving the external request; and schedule, based on a result of the determination, processing performance between a processing operation for the external request and an internal management operation for the nonvolatile memory device.

2. The memory controller of claim 1, wherein the memory controller is configured to determine the appearance frequency based on a specific logical address range or a specific logical address.

3. The memory controller of claim 1, wherein the memory controller is configured to schedule the processing performance by adjusting at least one of a credit allocation ratio, a computer resource allocation ratio, a processing opportunity assignment ratio, and priority.

4. The memory controller of claim 1, wherein:

the external request comprises a read request; and the memory controller is configured to raise the processing performance of the internal management operation more than the processing operation for the external request when a read request for a specific logical address range or a specific logical address is repeatedly received, during a set time, at set threshold value or more.

5. The memory controller of claim 1, wherein the internal management operation comprises at least one of a garbage collection operation, a wear-leveling operation, and a read reclaim operation.

6. An operating method of a memory controller that controls a storage medium, the operating method comprising:

determining, by the memory controller, appearance frequency of a logical address that is included in an external request when receiving the external request; and scheduling, by the memory controller, processing performance between a processing operation for the external request and an internal management operation for the storage medium, based on a result of the determination.

7. The operating method of claim 6, wherein the determining of the appearance frequency comprises determining the appearance frequency based on a specific logical address range or a specific logical address.

8. The operating method of claim 6, wherein the scheduling of the processing performance comprises scheduling the processing performance by adjusting at least one of a credit allocation ratio, a computer resource allocation ratio, a processing opportunity assignment ratio, and priority.

9. The operating method of claim 6, wherein:

the external request comprises a read request;

the determining the appearance frequency comprises determining whether a read request for a specific logical address range or a specific logical address is repeatedly received, during a set time, at a set threshold value or more; and the scheduling of the processing performance comprises raising the processing performance of the internal management operation more than the processing operation for the external request.

10. The operating method of claim 6, wherein the internal management operation comprises at least one of a garbage collection operation, a wear-leveling operation, and a read reclaim operation.

* * * * *